(12) United States Patent
Allison et al.

(10) Patent No.: US 11,871,849 B2
(45) Date of Patent: Jan. 16, 2024

(54) BED

(71) Applicant: Bob Barker Company, Inc., Fuquay-Varina, NC (US)

(72) Inventors: Gerrad Stephen Allison, Angier, NC (US); Lena Renee Butterfield, Apex, NC (US)

(73) Assignee: BOB BARKER COMPANY, INC., Fuquay-Varina, NC (US)

( * ) Notice: Subject to any disclaimer, the term of this patent is extended or adjusted under 35 U.S.C. 154(b) by 169 days.

(21) Appl. No.: 17/458,716

(22) Filed: Aug. 27, 2021

(65) Prior Publication Data
US 2022/0061539 A1 Mar. 3, 2022

Related U.S. Application Data (60) Provisional application No. 63/071,036, filed on Aug. 27, 2020.

(51) Int. Cl.
*A47C 19/00* (2006.01)
*F16B 5/00* (2006.01)

(52) U.S. Cl.
CPC ............ *A47C 19/005* (2013.01); *F16B 5/002* (2013.01)

(58) Field of Classification Search
CPC ... A47C 19/005; A47C 19/002; A47C 19/028; A47C 19/021; A47C 19/14; A47C 5/005; F16B 5/002; A47B 2230/0092; Y10S 5/924; B65D 2585/649; B65D 5/5035; B65D 81/36
See application file for complete search history.

(56) References Cited

U.S. PATENT DOCUMENTS

| | | | |
|---|---|---|---|
| 3,487,479 A * | 1/1970 | Grooms | A47D 7/002 5/99.1 |
| 3,513,490 A * | 5/1970 | Wagner | A47C 19/024 5/8 |
| 3,761,974 A * | 10/1973 | Kuss | A47C 27/085 5/915 |
| 3,913,154 A | 10/1975 | Sweeney | |
| 4,224,705 A * | 9/1980 | Santo | A47C 27/085 5/915 |
| 5,115,524 A | 5/1992 | Antosko | |
| 5,231,714 A * | 8/1993 | Mossbeck | A47C 23/00 5/186.1 |
| 5,557,813 A | 9/1996 | Steed et al. | |

(Continued)

FOREIGN PATENT DOCUMENTS

| | | | |
|---|---|---|---|
| GB | 2581583 A * | 8/2020 | A47B 3/06 |
| JP | 2009005902 A * | 1/2009 | A47C 19/005 |

(Continued)

*Primary Examiner* — Justin C Mikowski
*Assistant Examiner* — Alison N Labarge
(74) *Attorney, Agent, or Firm* — COATS & BENNETT, PLLC (57) ABSTRACT

A bed that includes a base with first and second sections each with a face and sidewalls that extend around the perimeter of and outward from one side of the face. The bed also includes a mattress and a support. The bed is selectively positionable between a first configuration and a second configuration. The first configuration includes the support positioned in the base and with the mattress supported on the base. The second configuration includes the mattress and the support positioned in the base for storage or shipping.

16 Claims, 11 Drawing Sheets

(56) References Cited

U.S. PATENT DOCUMENTS

| | | | |
|---|---|---|---|
| 5,728,478 A | | 3/1998 | Wilson et al. |
| 5,964,347 A | | 10/1999 | Urness |
| 8,490,228 B2 | | 7/2013 | Blyskal et al. |
| 8,739,974 B2 | | 6/2014 | TeVault et al. |
| 9,080,304 B1 | * | 7/2015 | Roberts .................. E02D 27/32 |
| 10,479,593 B2 | | 11/2019 | Oh |
| 10,485,356 B2 | | 11/2019 | Yang |
| 2004/0078896 A1 | * | 4/2004 | Hellyer ................ A47C 19/005 |
| | | | 5/400 |
| 2011/0138534 A1 | | 6/2011 | Kozel |
| 2015/0183567 A1 | | 7/2015 | TeVault et al. |
| 2019/0343293 A1 | | 11/2019 | Oh |
| 2020/0037782 A1 | | 2/2020 | Malott |

FOREIGN PATENT DOCUMENTS

| | | | | |
|---|---|---|---|---|
| JP | 2012235819 A | * | 12/2012 | ........... A47C 19/005 |
| JP | 2017209321 A | * | 11/2017 | |
| WO | WO 9000874 A1 | * | 7/1989 | ........... A47C 19/021 |

\* cited by examiner

BED

RELATED APPLICATIONS

This claims priority to U.S. Provisional Application No. 63/071,036, filed Aug. 27, 2020, the disclosure of which is incorporated herein by reference in its entirety.

BACKGROUND

A conventional bed includes a mattress that is supported on a bed frame. The bed is designed to occupy a particular position in a living environment, usually within a bedroom. Conventional beds are designed to remain in the position and are not designed to be easily moved. Moving the bed is often difficult work that requires the bed frame to be dismantled and then moved separately from the mattress.

There are situations in which a conventional bed is not suitable. One example includes an institutional facility, such as but not limited to hospitals, mental health facilities, and correctional facilities. Another example is for emergency situations, such as for a natural disaster in which persons are displaced from their homes. In these situations, the number of persons needing a bed and/or the location of the beds may vary. A bed that is portable would provide for the beds to be placed at the location where they are needed for a given situation. The bed can then be moved to a different location as the need changes.

Further, it would be advantageous for a bed to be able to be configured to aid in storage. This facilitates moving the bed from position to position as the need changes. This also facilitates storing the beds when not in use.

SUMMARY

One aspect is directed to a bed comprising a base comprising first and second sections each with a face and sidewalls that extend around the perimeter of and outward from one side of the face, a mattress, and a support. The bed is selectively positionable between a first configuration and a second configuration. The second configuration comprises the first and second sections mated together with the sidewalls in an overlapping arrangement and forming an enclosed interior space with the mattress and the support positioned within the interior space. The first configuration comprising the first and second sections mated together and the support positioned in the interior space and in contact with inner sides of each of the first and second faces and with the mattress positioned and supported on an outer side of one of the first and second faces.

In another aspect, an amount of overlap between the sidewalls of the first and second sections is greater in the first configuration than in the second configuration.

In another aspect, the support comprises a lattice framework comprising linear members that are pivotally connected together with the linear members movable between a contracted configuration with a first size and an extended configuration with a larger second size.

In another aspect, the linear members of the base comprise slots that engage together and provide for pivotal movement between the members.

In another aspect, the sidewalls of the second section fit within the sidewalls of the first section in the first and second configurations.

In another aspect, the base and the support are constructed from corrugated cardboard.

In another aspect, the support extends across an entirety of the interior space in the first configuration.

In another aspect, the bed comprises a cuboid shape in the first configuration.

One aspect is directed to a bed comprising: a base comprising a first section comprising a first face and first sidewalls that extend outward around a perimeter of the first face, and a second section comprising a second face and second sidewalls that extend outward around a perimeter of the second face; a support comprising interconnected members each with a first edge and a second edge; and a mattress. The bed is configurable between a first configuration and a second configuration. The second configuration comprising the first and second sections mated together to form an enclosed interior space with the first and second sidewalls overlapping a first amount and with the support and the mattress positioned in the interior space. The first configuration comprising the first and second sidewalls overlapping a greater second amount and with the first edge of the members contacting against an inner side of the first face and the second edge of the members contacting against an inner side of the second face and with the mattress positioned on an outer side of one of the first and second faces.

In another aspect, the interconnected members of the support form a lattice framework with the members having a straight shape and being pivotally connected together to move between a contracted position and an extended position.

In another aspect, the interconnected members comprise one or more slots on one or both of the first and second edges and with the members connected together at the slots.

In another aspect, the base and the support are constructed from corrugated cardboard.

In another aspect, the second sidewalls fit within the first sidewalls in the first and second configurations.

In another aspect, the mattress comprises at least one dimension that is greater than the dimensions of the interior space in the second configuration.

One aspect is directed to a method of using a bed. The method comprises: positioning the bed in a second configuration with a mattress and a support contained within an enclosed interior space formed by first and second sections of a base that are mated together with each of the first and second sections comprising a face and sidewalls that extend outward from the face; unmating the first and second sections and exposing the interior space; removing the mattress from the interior space; mating the first and second sections together and contacting a first edge of the support against an inner side of the face of the first section and contacting a second edge of the support against an inner side of the face of the second section; and positioning the mattress on an exterior side of the face of one of the first and second section and supporting the mattress.

In another aspect, after unmating the first and second sections, the method further comprises unfolding the support from a smaller folded configuration to a larger unfolded configuration.

In another aspect, the method further comprises reducing a height of the base from a first amount in the second orientation to a smaller second amount in the first orientation.

In another aspect, the method further comprises overlapping the sidewalls of the first and second sections a greater amount when supporting the mattress on the exterior side of the face of the first section than when the bed is in the first orientation.

DETAILED DESCRIPTION

Figure 1A:
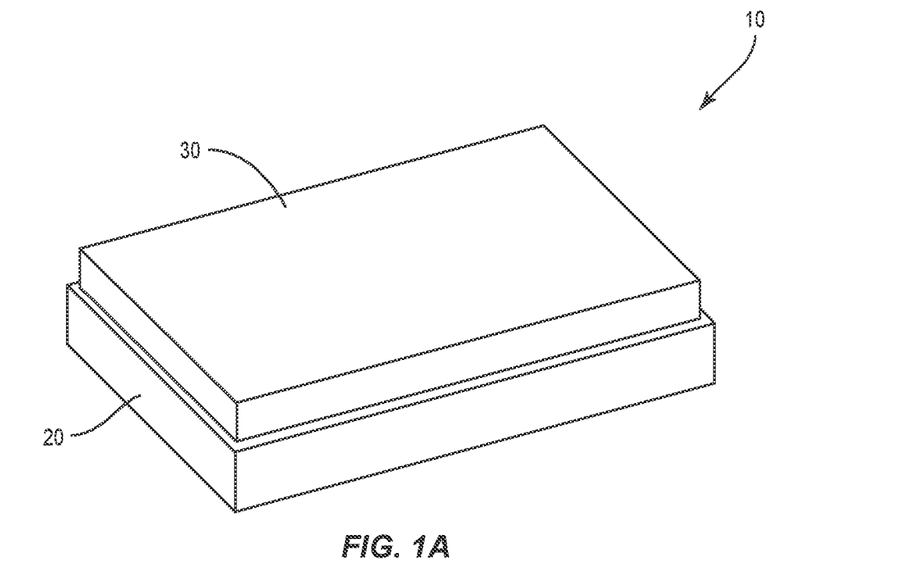
FIG. 1A is a perspective view of a bed in a first configuration.
Figure 1B:
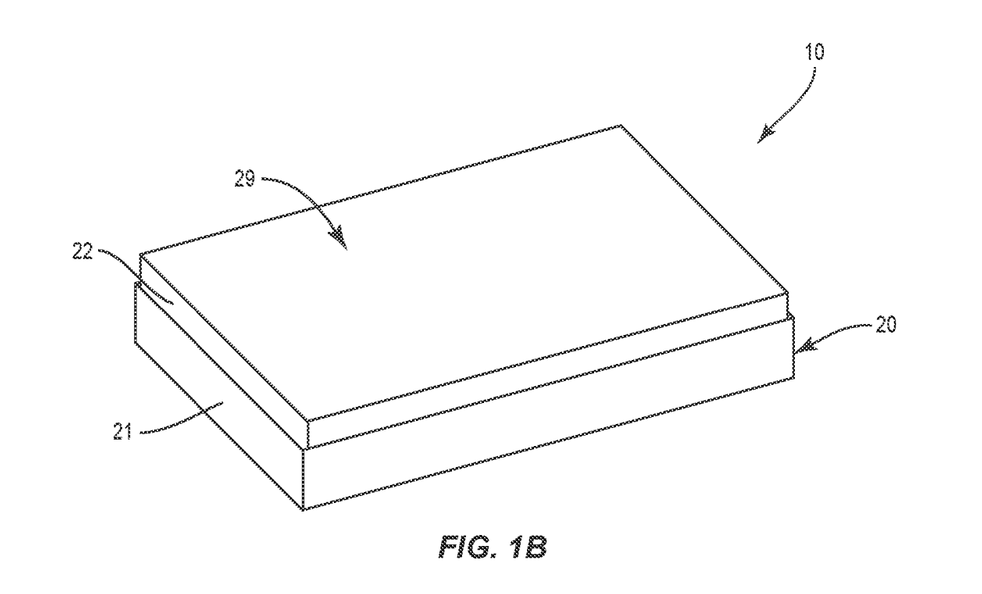
FIG. 1B is a perspective view of the bed of FIG. 1A in a second configuration.

The present application is directed to a bed 10 that is selectively positionable between a first configuration to support a user for sleeping and a second configuration for storage, shipping, etc. FIG. 1A illustrates the bed 10 in the first configuration and includes a base 20 that supports a mattress 30. A support (not illustrated in FIG. 1A) is positioned within the base 20 to provide support to the base 20. FIG. 1B illustrates the bed 10 in the second configuration with the base 20 forming an exterior shell that houses the mattress 30 and the support (not illustrated in FIG. 1B).

Figure 2:
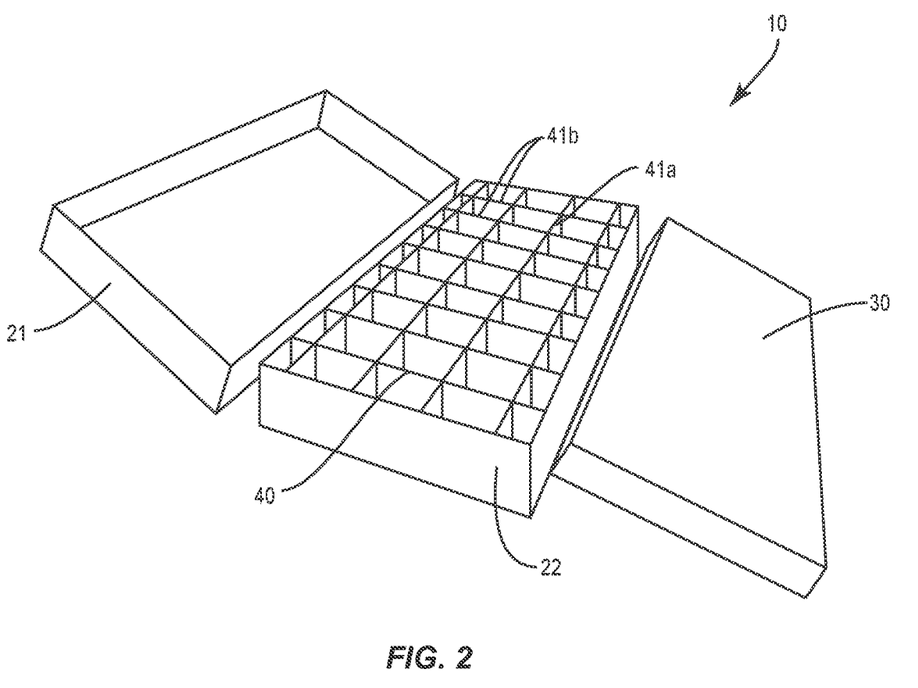
FIG. 2 is a perspective view of a bed in a disassembled state with the first and second sections separated and the mattresses removed from the interior space.

FIG. 2 illustrates the bed 10 in a disassembled state. The first and second sections 21, 22 of the base 20 are separated. The support 40 is sized to fit between the first and second sections 21, 22. In the first configuration, the support 40 supports each of the first and second sections 21, 22 to provide support to the mattress 30. In the second configuration, the support 40 may remain in the same orientation, or may be reduced in size to provide for both the support 20 and mattress 30 to fit in the interior space 29.

Figure 3:
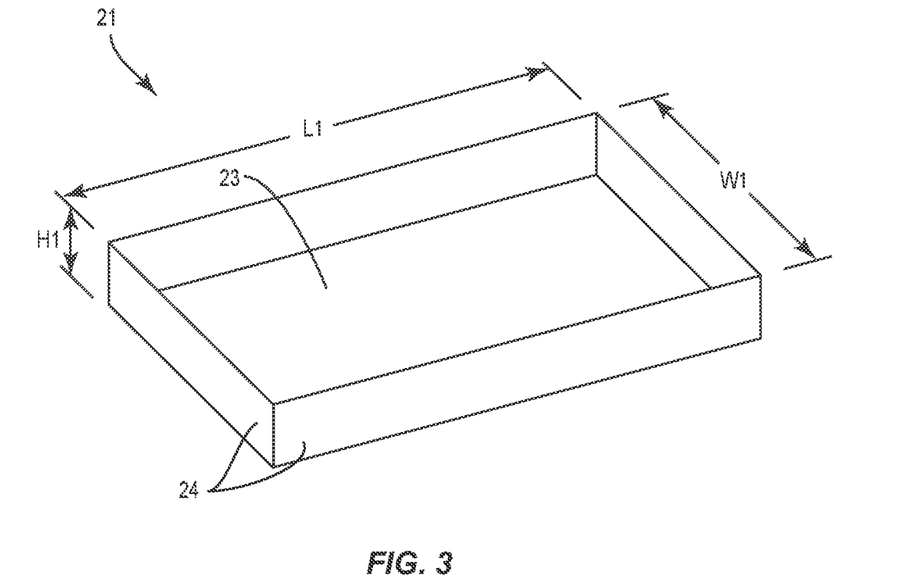
FIG. 3 is a schematic perspective view of a first section of a base.
Figure 4:
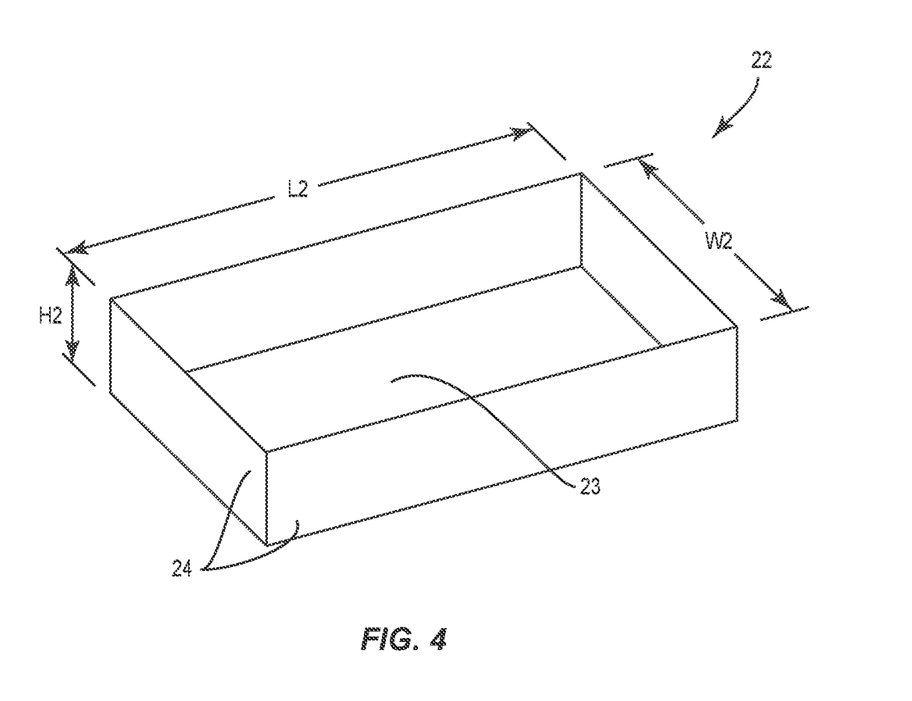
FIG. 4 is a schematic perspective view of a second section of a base.

FIG. 3 illustrates the first section 21 and FIG. 4 illustrates the second section 22. Each of the first and second sections 21, 22 includes a horizontal face 23 and vertical sidewalls 24. The vertical sidewalls 24 extend around the perimeter of the faces 23 and extend outward from an inner side of the horizontal face 23. The first and second sections 21, 22 include an open side that is formed between the vertical sidewalls 24 and face 23. The horizontal face 23 and vertical sidewalls 24 are solid and form an enclosed interior space 29 to house the support 40 and/or mattress 30 when the first and second sections 21, 22 are nested together. In one example, the faces 23 are planar and the sidewalls 24 extend directly outward from and are perpendicular to the faces 23. In another example, the sidewalls 24 extend outward in non-perpendicular angles from the faces 23.

The first section 21 include a length L1 and width W1. The vertical sidewalls 24 include a height H1 measured between the inner side of the face 23 and a top edge of the vertical sidewalls 24. Likewise, the second section 22 includes a length L2 and width W2. A height H2 of the vertical sidewalls 24 is measured between an inner side of the face 23 and the edge of the vertical sidewalls 24. The lengths and widths L1, L2, W1, W2 of the first and second sections 21, 22 are sized relative to each other to nest together in the first and second configurations with the sidewalls 24 overlapping. In one example, the faces 23 are parallel to each other in the first configuration. When nested together, the first section 21 may be nested within the second section 22, or the second section 22 may be nested within the first section 21.

The heights H1, H2 of the vertical sidewalls 24 provide for overlap in the first and second configurations. This provides for an enclosed interior space 29 to be formed by the first and second sections 21, 22 to protect the support 40 and mattress 30. In one example, the heights H1, H2 are the same. In another example, the heights H1, H2 are different.

The base 20 can be constructed from various materials. In one example, the base 20 is constructed from heavy-duty corrugated cardboard. In other examples, the base 20 is constructed from one or more of plastics, foam materials, and particle board. In one example, each of the first and second sections 21, 22 have the same construction. In another example, the sections 21, 22 are constructed from different materials.

Figure 5:
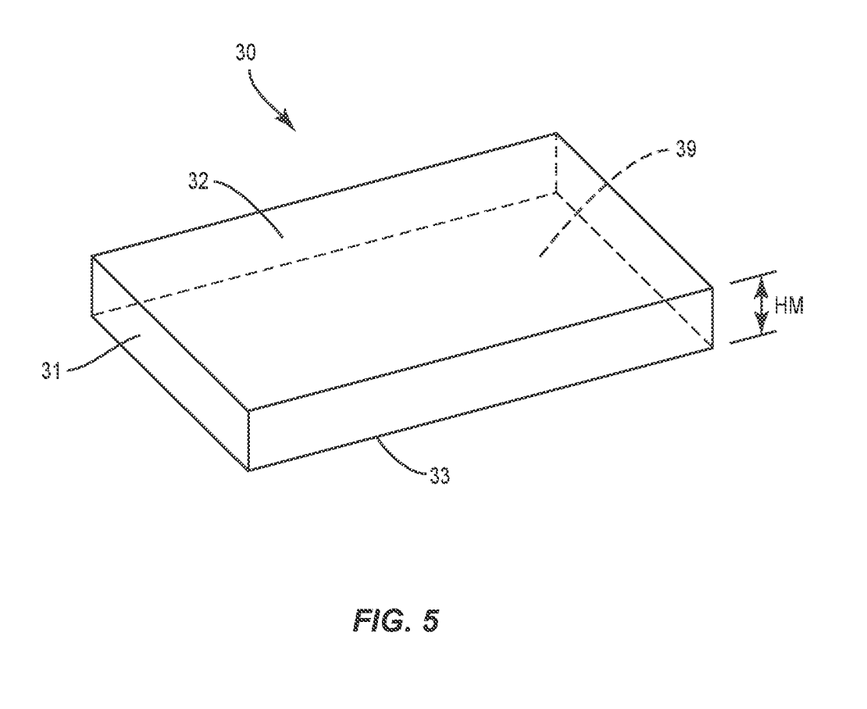
FIG. 5 is a schematic perspective view of a mattress.

The mattress 30 is configured to support the body of the user when the bed 10 is in the first configuration. In one example as illustrated in FIG. 5, the mattress 30 includes a mattress core 39 that is contained within a cover 31. The mattress core 39 can be constructed of a variety of materials including but not limited to foam pads, cotton pads, and polyester pads. In one example, foam pads are constructed of highly flame resistant polymerized synthetic open celled cushioning foam. In one example, the polyester pad is constructed of thermally bonded polyester fiber. In one example, the cotton pad comprises re-cycled post-industrial denim and cotton fibers bonded together by poly fibers (maximum 10%). The mattress 30 can further include batting that is a sheet-like member that is wound around the pads. The cover 31 surrounds the mattress core 39 and can be constructed from a variety of different materials. These materials can provide one or more of being antibacterial, antimicrobial, antifungal, fluid resistant, and fire resistant. In one example, the mattress 30 is an inflatable member.

The mattress 30 is sized to fit within the interior space 29 formed between the first and second sections 21, 22 when in the second configuration. FIG. 5 schematically illustrates a mattress 30 with a substantially rectangular shape. The mattress 30 can also include various other shapes and dimensions. In one example, the mattress 30 includes a length and width that are less than those of the first and second sections L1, L2, W1, W2. In one example, the mattress 30 is constructed to be compressible to fit within the interior space 50 even though one or more of the dimensions is larger than that of the first and/or second sections 21, 22. In one example, the mattress 30 is dimensioned to be smaller than one or both of the horizontal faces 23 of the first and second sections 21, 22. This provides for the mattress 30 to be contained on the face 23 and fully supported when the bed 10 is in the first configuration as illustrated in FIG. 1. In one example, one or more dimensions are greater than one or both horizontal faces 23 and extend outward beyond the edges when the mattress 30 is support in the first configuration. As illustrated in FIG. 5, the mattress 30 includes a height HM measured between opposing faces 32, 33.

Figure 6:
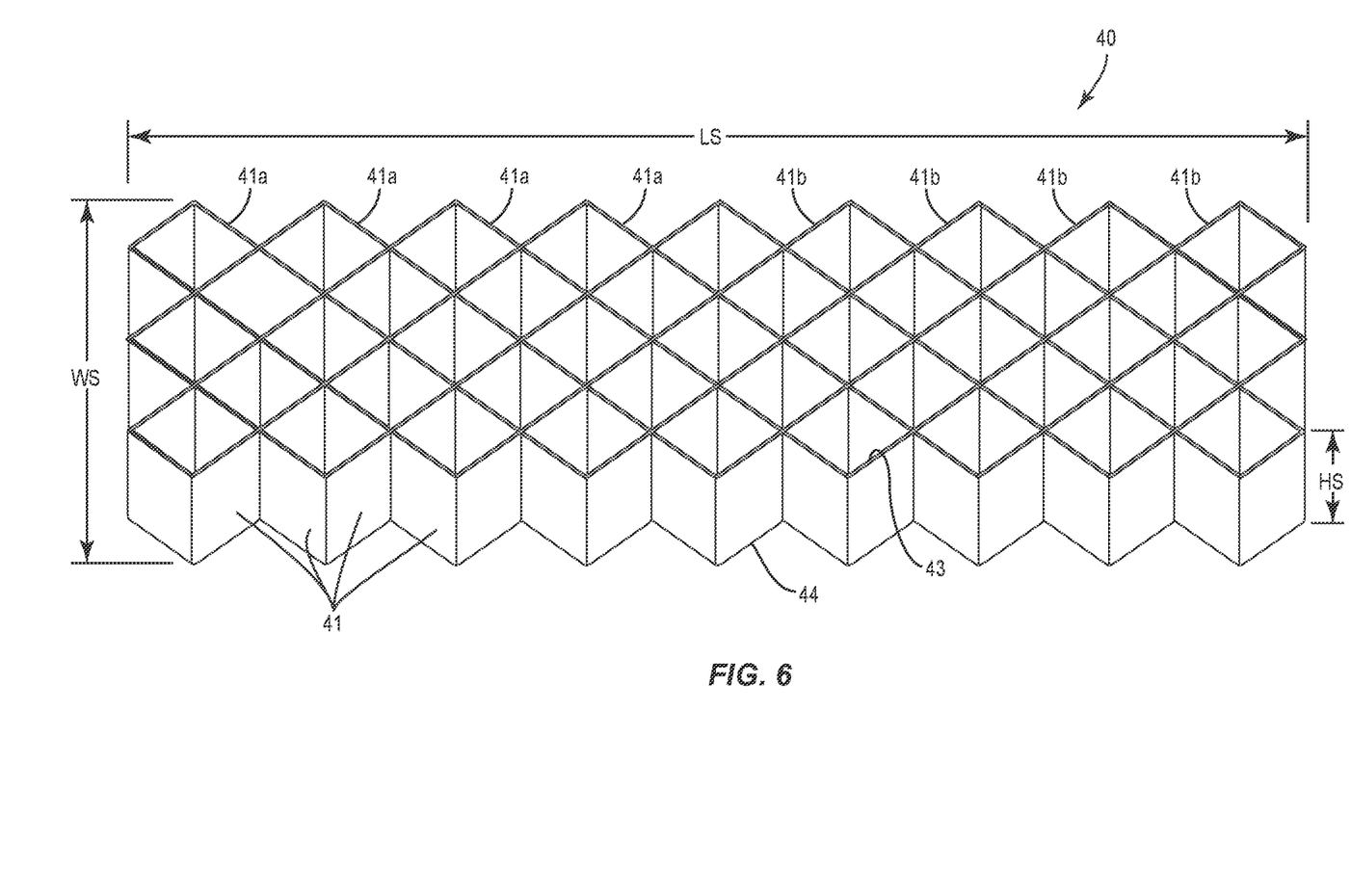
FIG. 6 is a perspective view of a support.

The support 40 is configured to support and position the first and second sections 21, 22 when the bed 10 is in the first configuration. As illustrated in FIG. 6, the support 40 includes a length LS, width WS, and height HS. In one example, the length LS and width LW are smaller than the first section 21 to fit within the first section 21. In one example, the length LS and width LW are smaller than the second section 22 to fit within the second section 22. In one example as illustrated in FIG. 2, the support 40 fills the entirety of one of the first and second sections 21, 22.

Each of the members 41 includes a first edge 43 and an opposing second edge 44. The height HS of the support 40 is measured between the first and second edges 43, 44.

In one example as illustrated in FIG. 6, the support 40 includes a lattice framework of elongated members 41. The lattice framework includes first members 41a that are spaced apart in a first direction and second members 41b that are spaced apart in a second direction. The first and second members 41a, 41b intersect to form the lattice structure. In one example, the first members 41a are parallel with each other and the second members 41b are parallel with each other (and the first members 41a are perpendicular to the second members 41b). In one example, the members 41 include a straight shape.

In the various examples, the members 41 can be aligned at different orientations relative to the first and second sections 21, 22. In the example of FIG. 2, members 41b are perpendicular to the elongated sidewalls 24 and members 41a are parallel with the elongated sidewalls 24. In the example of FIG. 6, the members 41a, 41b are aligned at different angles. In one example, members 41a are aligned at an angle of 45° relative to the elongated sidewalls 24 and members 41b are aligned at an angle of 135°.

Figure 7:
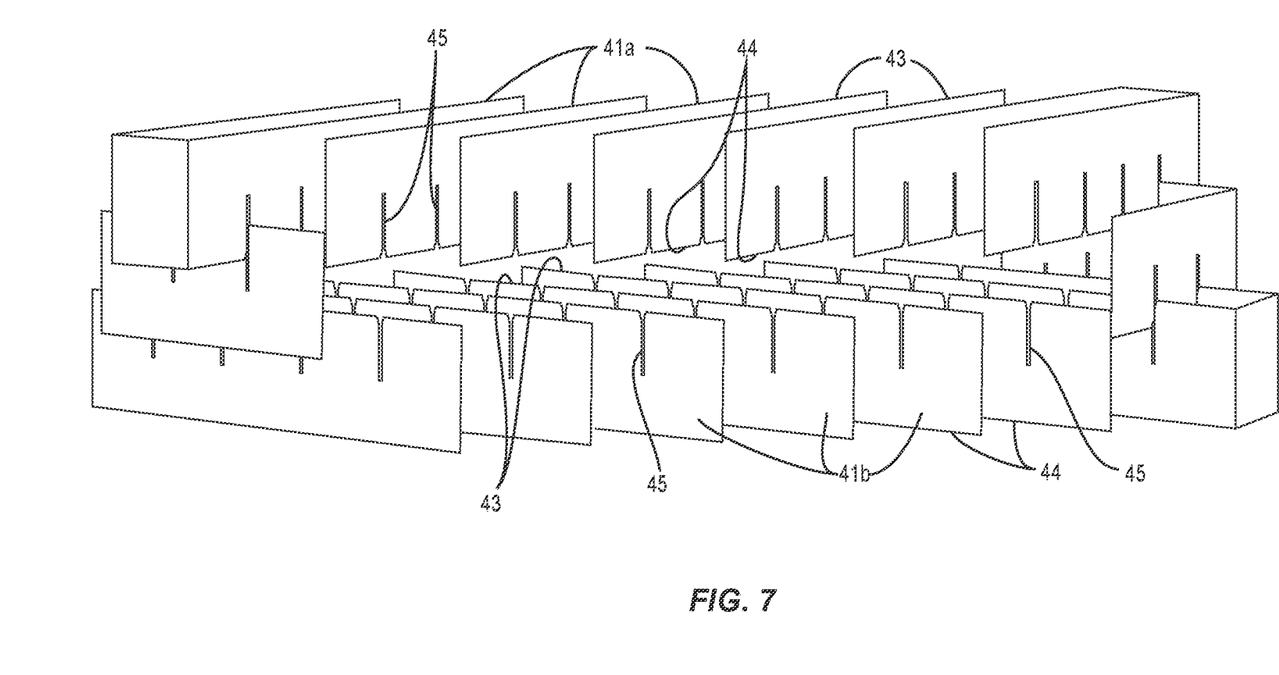
FIG. 7 is a perspective view of support members in a partially assembled configuration.

The members 41 can be secured together in different manners. In one example, one or more of the members 41 includes slots 45 on one or both edges 43, 44. FIG. 7 illustrates the members 41a having slots 45 on the edge 44 that engage with corresponding slots 45 on the edge 43 of members 41b. Some members 41 can include slots 45 on both edges 43, 44. Some members 41 can include no slots.

Figure 8:
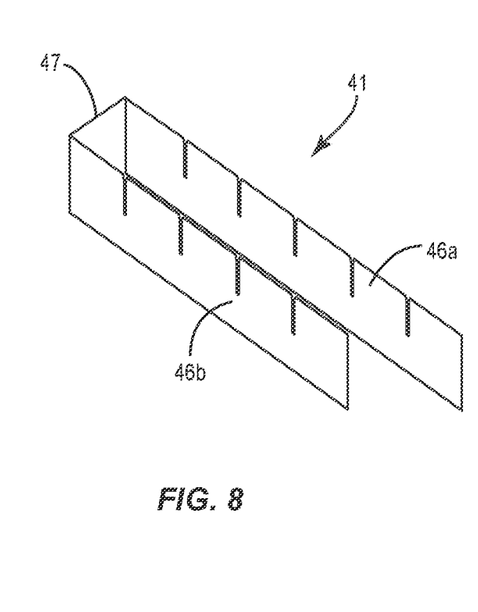
FIG. 8 is a perspective view of a support member.
Figure 9:
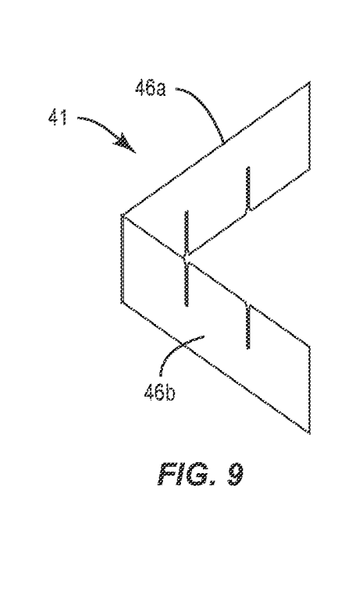
FIG. 9 is a perspective view of a support member.
Figure 10:
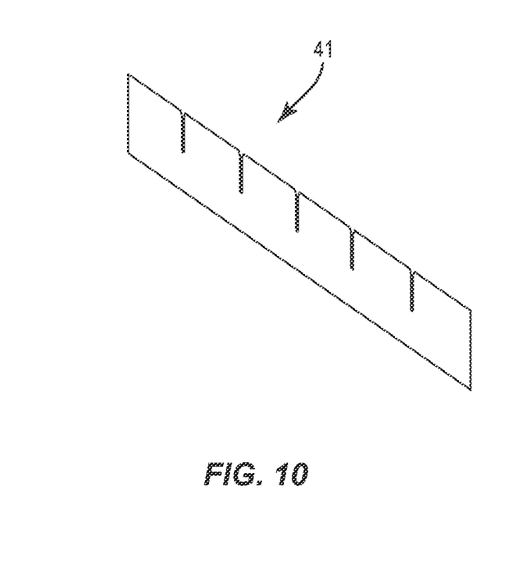
FIG. 10 is a perspective view of a support member.
Figure 14:
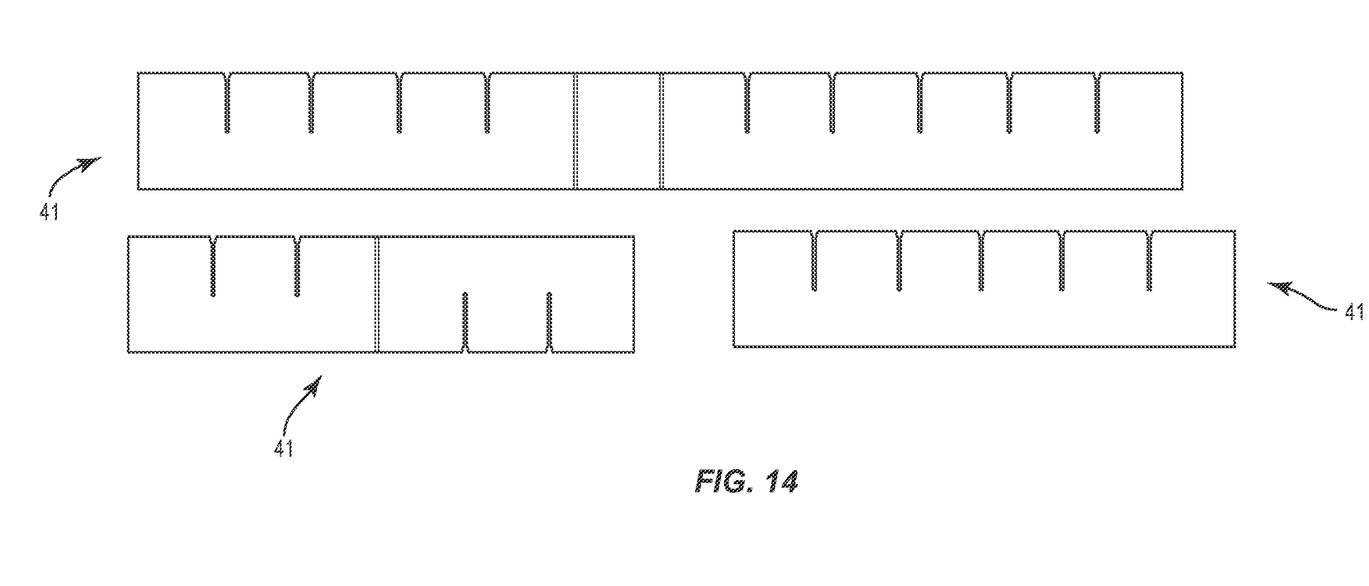
FIG. 14 are side views of support members.

The members 41 can have various shapes and sizes. FIG. 8 illustrates a member 41 with first and second legs 46a, 46b that are connected together by a cross brace 47. In this example, leg 46a is longer than leg 46b. Other examples include the legs 46a, 46b having the same length, and leg 46b longer than leg 46a. FIG. 9 illustrates a member 41 with legs 46a, 46b that are connected together and aligned at a 90° angle. FIG. 10 illustrates a member 41 that has a straight shape. In one example, the support 40 is constructed from members 41 with two or more different shapes and configurations. In another example, the support 40 is constructed from members 41 that each has the same shape and configuration. FIG. 14 illustrates examples of various support members 41.

In one example, the members 41 are pivotally connected together. This provides for the support 40 to be adjusted between a first shape for supporting the first and second sections 21, 22 in the first configuration, and a smaller second shape for storage in the second configuration. The members 41 remain connected together when moving between the first and second shapes. In one example, the attachment at the slots 45 provide for the pivoting movement.

The members 41 can be constructed from various materials. In one example, the members 41 are constructed from heavy-duty corrugated cardboard. In other examples, the members 41 are constructed from plastics, foam materials, and particle board. The members 41 of a support 40 can be constructed from the same or different materials.

Figure 11A:
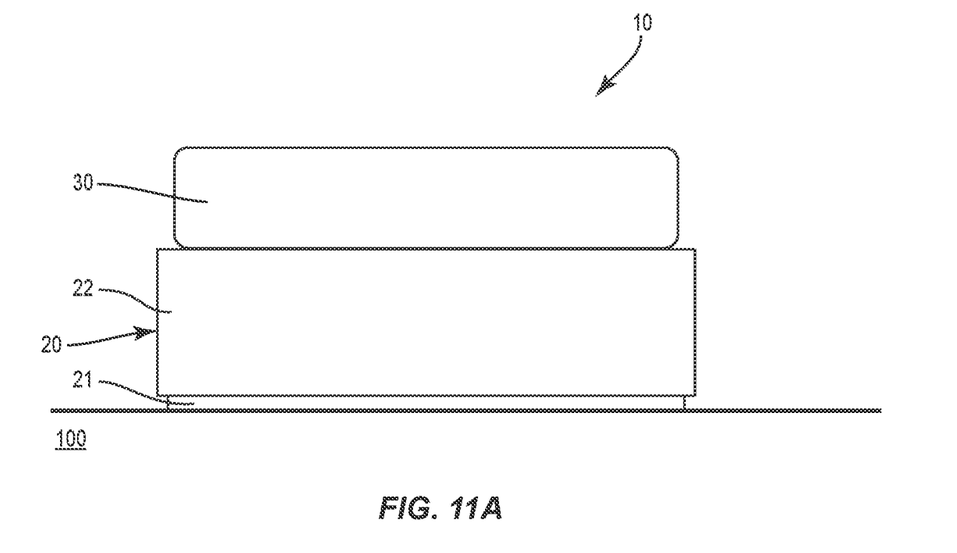
FIG. 11A is a side schematic view of a bed in a first configuration.
Figure 11B:
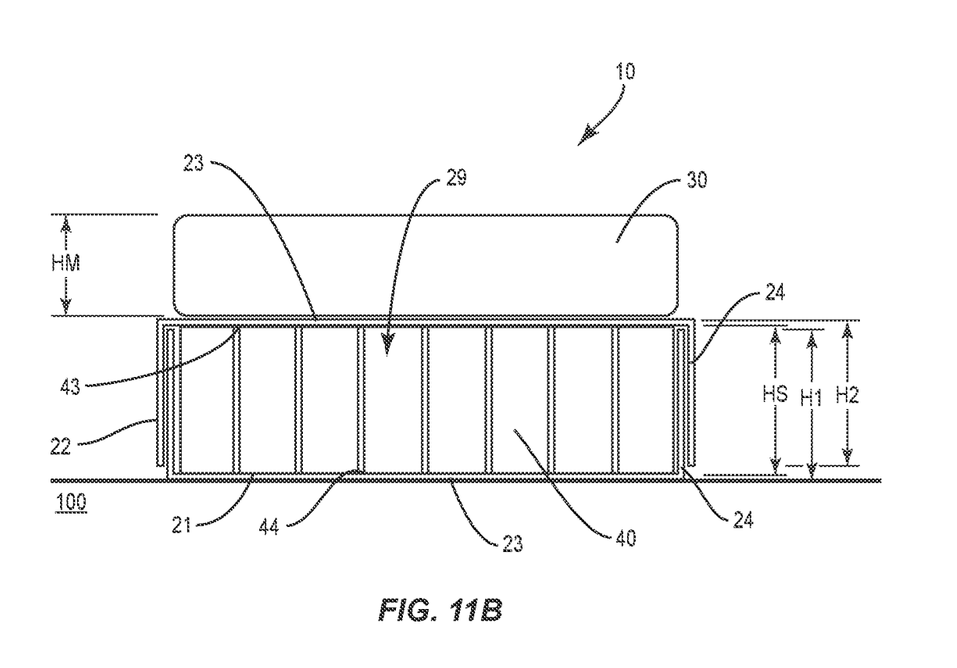
FIG. 11B is a schematic section view of the bed of FIG. 11A in the first configuration.

The various components are sized for the bed 10 to be configured in both the first and second configurations. FIG. 11A illustrates a side view of a bed 10 in the first configuration and FIG. 11B illustrates a schematic section view of the bed 10. The height HS of the support 40 is greater than the heights H1 and H2 of the vertical sidewalls 24 of the first section 21. This sizing difference provides for the support 40 to contact against and support the first and second sections 21, 22. This is achieved as the support 40 is positioned in the interior space 29 with the bottom edge 44 in contact against the inner side of the face 23 of the first section 21 and the top edge 43 in contact against the inner side of the face 23 of the first section 21. The vertical sidewalls 24 of the first and second sections 21, 22 overlap thus enclosing the interior space 29. The enclosed interior space 29 can prevent the ingress of materials, such as debris and water.

Further, the support 40 is sized to space the ends of the outer edges of the vertical sidewalls 24 away from a contact surface. As illustrated in FIG. 11B, the edges of the vertical sidewalls 24 of the first section 21 are spaced away from the face 23 of the second section 22. The edges of the vertical sidewalls 24 of the second section 22 are spaced away from a floor 100.

In one example as illustrated in FIG. 11B, the height HS of the support 40 is greater than the height H2 of the vertical sidewalls 24 of the second section 22. In another example, the height HS of the support 40 is less than the height H2.

Figure 12A:
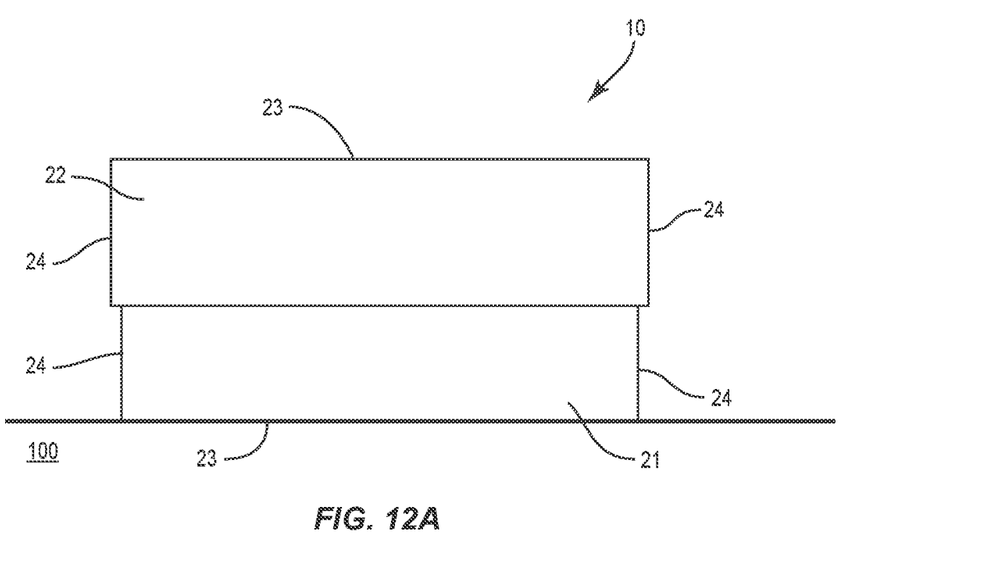
FIG. 12A is a side schematic view of a bed in a second configuration.
Figure 12B:
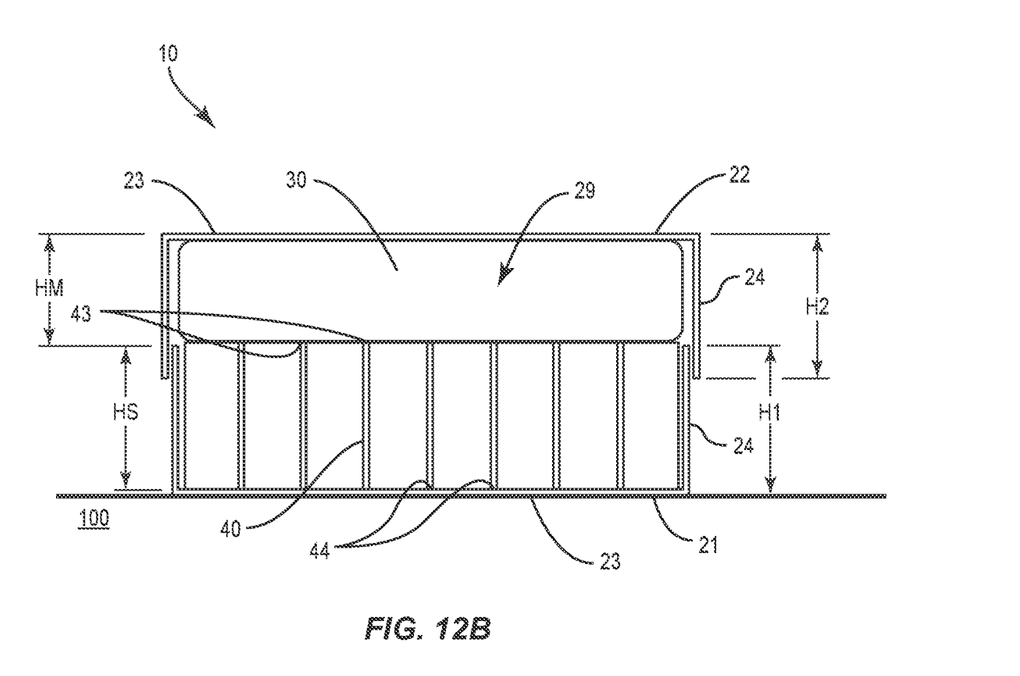
FIG. 12B is a schematic section view of the bed of FIG. 12A in the second configuration.

FIGS. 12A and 12B illustrate the bed 10 in the second configuration with the mattress 30 positioned in the interior space 29. The combined height HS of the support 40 and the height HM of the mattress 30 is less than the combined height H1 of the vertical sidewalls 24 of the first section 21 and the height H2 of the vertical sidewalls 24 of the second section 22. This provides for the support 40 and mattress 30 to be positioned in the interior space 29 and for the vertical sidewalls 24 to overlap thus enclosing the interior space 29. In this second configuration, the first edge 43 of the support 40 contacts against the mattress 30 and the second edge 44 contacts against the inner side of the face 23 of the first section 21. The mattress 30 contacts against the support 40 on a first side and against the inner side of the face 23 of the second section 22.

FIG. 12B illustrates the support 40 positioned in the interior space with the first and second edges 43, 44 facing outward towards the faces 23. In another example, the support 40 is positioned in the interior space with the first and second edges 43, 44 facing in other directions. In another example, the support 40 is further reduced in size to further provide for positioning in the interior space 29 in the second configuration.

In use, the bed 10 is positioned in the second configuration with the first and second sections 21, 22 mated together for storage, shipping, and other times when not in use. The bed 10 is relatively compact thus facilitating movement and storage. The beds 10 can be easily stacked together because of the shape. In one example, the bed 10 is a cuboid with rectangular sides that facilitate stacking. Also in this second configuration, the first and second sections 21, 22 extend around and enclose the support 40 and mattress 30 thus providing protection.

Figure 13:
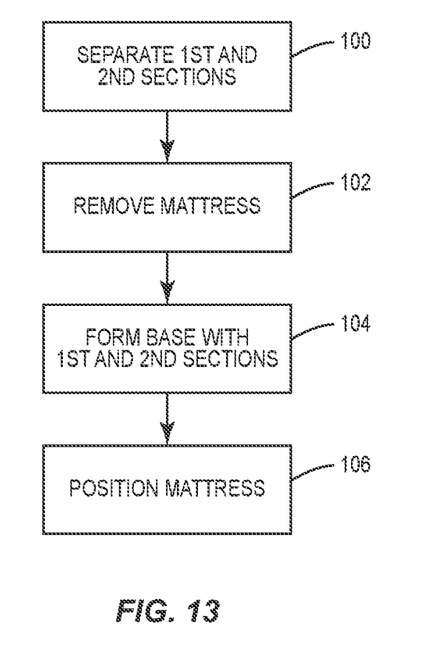
FIG. 13 is a flowchart diagram of a method of using a bed.

FIG. 13 illustrates a method of using the bed 10. Initially, the bed 10 is in the second configuration for storage, shipping, etc. The bed 10 is positioned in the location where it is to be used and the first and second sections 21, 22 are un-mated and separated (block 100). The mattress 30 is removed from the interior space 29 (block 102). Once the mattress 30 is removed, the first and second sections 21, 22 are mated back together with the support 40 remaining in the interior space 29 to form the base 20 (block 104). The mattress 30 is positioned on one of the faces 23 of the first and second sections 21, 22 (block 106). The user can then lay on the mattress 30 which is supported by the base 20 (comprising the first and second sections 21, 22) and the support 40.

Once finished using the bed 10 in the first configuration, the process can be reversed to store or ship the bed 10. The first and second sections 21, 22 are unmated and opened, and the mattress 30 is positioned on the support 40 in the interior space 29. The first and second sections 21, 22 are then mated together to contain the mattress 30 and support 40 in the interior space 29.

One application for using the bed 10 is for mental health and correctional institutions. The beds 10 can be stored in the second configuration when not in use. When needed, the beds 10 are assembled into the first configuration to allow for a person to sleep. Once finished, the beds 10 can be reconfigured into the second configuration. The beds 10 are straight-forward to assemble and disassemble, provide a sufficient object to allow a user to sleep, and are relatively inexpensive. Further, for some uses, the components of the bed 10 cannot be crafted into a weapon which could provide for the user to injure themselves or another. This is of particular importance when the beds are used in some mental health and correctional institutions.

The bed 10 can also be used for a variety of other uses. Examples include but are not limited to schools, for emergency shelter such as for use by the Red Cross, and various camps.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are second ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A bed comprising:
    a base comprising first and second sections each with a face and sidewalls that extend around the perimeter of and outward from one side of the face;
    a mattress;
    a support with a bottom edge and an opposing top edge;
    the bed selectively positionable between a first configuration and a second configuration;
    the second configuration comprising the first and second sections mated together with the sidewalls in an overlapping arrangement and forming an enclosed interior space with the mattress and the support positioned within the interior space with the bottom edge of the support in contact with an inner side of the face of the first section and the top edge of the support in contact with the mattress; and
    the first configuration comprising the first and second sections mated together and the support positioned in the interior space and the bottom edge of the support in contact with the inner side of the face of the first section and the top edge in contact with an inner side of the face of the second section and with the mattress positioned and supported on an outer side of one of the faces;
    wherein a combined height of the mattress and the support is less than a combined height of the sidewalls of the first and second sections for the sidewalls to overlap in the second configuration.

2. The bed of claim 1, wherein an amount of overlap between the sidewalls of the first and second sections is greater in the first configuration than in the second configuration.

3. The bed of claim 1, wherein the support comprises a lattice framework comprising linear members that are pivotally connected together.

4. The bed of claim 3, wherein the linear members of the base comprise slots that engage together and provide for pivotal movement between the members.

5. The bed of claim 1, wherein the base and the support are constructed from corrugated cardboard.

6. The bed of claim 1, wherein the support extends across an entirety of the interior space in the first configuration and the second configuration.

7. The bed of claim 1, wherein the bed comprises a cuboid shape in the first configuration.

8. A bed comprising:
    a base comprising:
        a first section comprising a first face and first sidewalls that extend outward around a perimeter of the first face;
        a second section comprising a second face and second sidewalls that extend outward around a perimeter of the second face;
    a support comprising interconnected members each with a first edge and a second edge;
    a mattress;
    the bed is configurable between a first configuration and a second configuration;
    the second configuration comprising the first and second sections mated together to form an enclosed interior space with the first and second sidewalls overlapping a first amount and with the support and the mattress positioned in the interior space; and
    the first configuration comprising the first and second sidewalls overlapping a greater second amount and with the first edge of the members contacting against an inner side of the first face and the second edge of the members contacting against an inner side of the second face and with the mattress positioned on an outer side of one of the first and second faces;
    the support comprising a bottom edge that contacts against the first face of the first section in both the first configuration and the second configuration, and a top edge that contacts against the second face in the first configuration and against the mattress in the second configuration.

9. The bed of claim 8, wherein the interconnected members of the support form a lattice framework with the members having a straight shape and being pivotally connected together.

10. The bed of claim 9, wherein the interconnected members comprise one or more slots on one or both of the first and second edges and with the members connected together at the slots.

11. The bed of claim 8, wherein the base and the support are constructed from corrugated cardboard.

12. The bed of claim 8, wherein the support extends across an entirety of one of the first and second sections in both the first configuration and the second configuration.

13. A method of using a bed comprising:
    positioning the bed in a second configuration with a mattress and a support contained within an enclosed interior space formed by first and second sections of a base that are mated together with each of the first and second sections comprising a face and sidewalls that extend outward from the face and contacting a first edge of the support against an inner side of the face of the first section and a second edge of the support against the mattress;
    unmating the first and second sections and exposing the interior space;
    removing the mattress from the interior space;
    mating the first and second sections together in a first configuration and contacting the first edge of the support against the inner side of the face of the first section and contacting the second edge of the support against an inner side of the face of the second section; and
    positioning the mattress on an exterior side of the face of one of the first and second sections and supporting the mattress with the first and second sections in the first configuration.

14. The method of claim 13, further comprising reducing a height of the base from a first amount in the second orientation to a smaller second amount in the first orientation.

15. The method of claim 13, further comprising overlapping the sidewalls of the first and second sections a greater amount in the first configuration than in the second configuration.

16. The method of claim 13, further comprising extending the support across an entirety of the first section in both the first configuration and the second configuration.

* * * * *